INVENTORS
HARRY T. PRESTIGE, DOUGLAS G. EADE,
ANTHONY P. HALE, BRIAN M. LEE,
RALPH T. LOVELOCK, WILLIAM F. P. SMITH &
BY VICTOR TEACHER

ATTORNEYS

June 18, 1963 H. T. PRESTIGE ETAL 3,093,887
SECURING INSERTS IN SHEET MATERIAL
Filed July 7, 1959 8 Sheets-Sheet 2

INVENTORS
HARRY T. PRESTIGE, DOUGLAS G. EADE,
ANTHONY P. HALE, BRIAN M. LEE,
RALPH T. LOVELOCK, WILLIAM F. P. SMITH &
BY VICTOR TEACHER

ATTORNEYS (A)     (B)

(A)     (B)

June 18, 1963 H. T. PRESTIGE ETAL 3,093,887
SECURING INSERTS IN SHEET MATERIAL
Filed July 7, 1959 8 Sheets-Sheet 6

INVENTORS
HARRY T. PRESTIGE, DOUGLAS G. EADE,
ANTHONY P. HALE, BRIAN M. LEE,
RALPH T. LOVELOCK, WILLIAM F. P. SMITH &
BY VICTOR TEACHER

ATTORNEYS

June 18, 1963  H. T. PRESTIGE ETAL  3,093,887
SECURING INSERTS IN SHEET MATERIAL
Filed July 7, 1959  8 Sheets-Sheet 7

INVENTORS.
HARRY T. PRESTIGE, DOUGLAS G. EADE,
ANTHONY P. HALE, BRIAN M. LEE,
RALPH T. LOVELOCK, WILLIAM F. P. SMITH &
BY VICTOR TEACHER

ATTORNEYS.

June 18, 1963 H. T. PRESTIGE ETAL 3,093,887
SECURING INSERTS IN SHEET MATERIAL
Filed July 7, 1959 8 Sheets-Sheet 8

INVENTORS
HARRY T. PRESTIGE, DOUGLAS G. EADE,
ANTHONY P. HALE, BRIAN M. LEE,
BY RALPH T. LOVELOCK, WILLIAM F. P. SMITH &
VICTOR TEACHER

ATTORNEYS

United States Patent Office 3,093,887,
Patented June 18, 1963

3,093,887
SECURING INSERTS IN SHEET MATERIAL
Harry Thomas Prestige, Edmonton, Douglas Grey Eade, Nazeing, Anthony Peter Hale, Hoddesdon, Brian Morton Lee, Enfield, Ralph Tweed Lovelock, St. Albans, William Frederick Patrick Smith, Cheshunt, and Victor Teacher, Enfield, England, assignors to Belling & Lee Ltd., Enfield, Middlesex, England
Filed July 7, 1959, Ser. No. 825,512
Claims priority, application Great Britain July 11, 1958
4 Claims. (Cl. 29—155.55)

This invention relates to a method and apparatus for securing together two pieces of material and, more particularly, to a method and apparatus for securing a substantially rigid insert to a substantially rigid sheet of material.

It has been proposed heretofore to secure an insert of a rigid material to a rigid sheet of metal or electrical insulating material by bringing a flat surface of the insert into contact with a face of the sheet and subjecting the insert and the sheet to the action of a punch and die. The insert and the sheet are interposed between the punch and the die, the die being constructed with a cutting edge having the same contour as the external contour of the flat surface of the insert. When pressure is applied by the punch, a piece of material having the same contour as the external contour of the insert is sheared from the sheet and the insert itself is forced into the sheet in place of the sheared piece of material.

This method has proved to be unsatisfactory because the insert, being the same size as the aperture created by the removal of the piece of material is not tightly secured to the sheet of material. It is proposed to remedy this difficulty by providing an insert, constructed in accordance with the present invention, that has a cutting edge which is smaller than the section of the insert that fills the aperture. The cross section of the sheared piece of material is smaller than the insert so that the aperture is enlarged by the insert and provides a secure connection.

In a representative embodiment of the invention, there is provided a method and apparatus for securing a substantially rigid insert in a substantially rigid sheet of material which includes the steps of bringing a leading face of the insert into contact with a face of the sheet of material and subjecting the insert and the sheet material to the action of a pressure applying device and die. The die and the leading face of the insert are each formed with a cutting edge of substantially the same contour so that, on pressure being applied, the two cutting edges co-operate to shear from the sheet material a piece of material having substantially the same contour as the cutting edges. A portion of the insert following the cutting edge thereof is forced into the sheet in place of the sheared piece of material, this portion of the insert having its peripheral wall so formed as to key to the walls of the aperture in the sheet material formed as a result of the shearing out of the piece of material. The portion of the insert following the cutting edge is knurled by ridging, serrating or otherwise modifying the portion so as to bring about the desired keying. The knurl preferably takes the form of alternate grooves and ridges of triangular cross-section running the length of this portion, the ridges and grooves being parallel to the axis along which the insert moves when acted upon by the pressure applying device.

The knurled portion of the insert is separated from the upper end or the head of the insert by a peripheral indentation such as a peripheral recess, a radiused surface or a dished portion so that, after the insert is embedded in the sheet material, the sheet material flows back into this peripheral recess and anchors the insert. This provision is particularly suitable where the primary object of the insert is to mechanically fix two sheets together.

Where a good electrical contact between the insert and an electrical conducting surface on the sheet material is desired, as in printed circuit applications, the head of the insert may be in the form of an outwardly extending flange. When the insert is passed through the electrical conducting surface the flange contacts the electrical conducting surface on the periphery of the aperture and provides good electrical contact between the surface and the flange on the insert.

The length of the knurled portion is made slightly longer than the thickness of the sheet material so that the die peens the end of the knurled section nearest the cutting edge over the sheet material. This peened over part serves to rivet the insert to the sheet material.

The insert may be made of an electrical insulating material and may be secured in a sheet of metal or in a sheet of an electrical insulating material. Alternatively, a metal insert may be secured in a sheet of an electrical insulating material or in a sheet of metal. Of course, the insert material should be harder than the sheet material.

The pressure applying device may include a hand, hydraulically or electrically operated press or like device. The actual value of the pressure to be applied depends on the relative hardness of the sheet and the insert material and also on the thickness of the sheet.

The invention is advantageous in that it dispenses with the operation of pre-drilling holes into the sheet material as is required in conventional fixing methods using rivets, nuts, bolts and the like. Through the exercise of the invention, the hole in the sheet material is formed simultaneously with the insertion of the insert into the material and the insert is securely embedded in the sheet material because it is keyed to this material. In addition to keying, the sheet material fills a peripheral indentation at one end of the insert and the other end of the insert is peened over the face of sheet material, thereby ensuring a secure connection between the insert and the sheet.

This invention may be better understood from the following detailed description taken in conjunction with the accompanying figures of the drawings in which.

Figures 1, 2, 3:
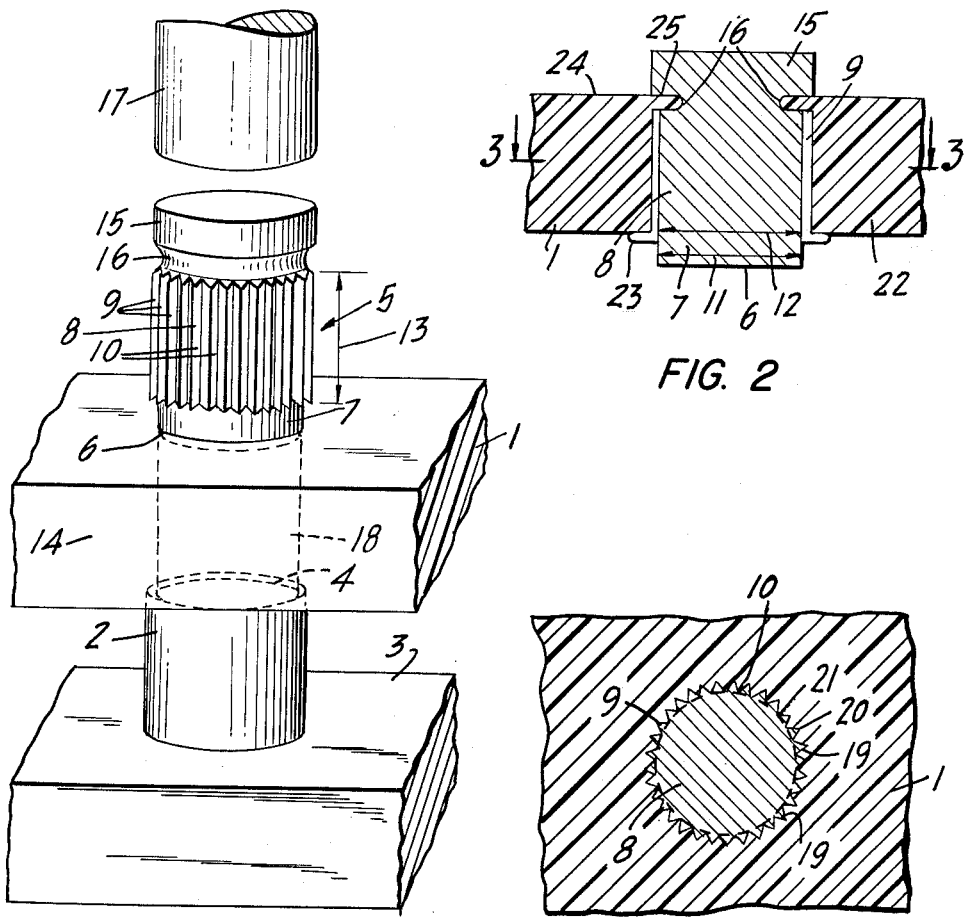
FIG. 1 is a perspective view of an apparatus for inserting a rivet constructed in accordance with the invention into a sheet of material.
FIG. 2 is a view in elevation showing the rivet of FIG. 1 after it is inserted into the sheet of material.
FIG. 3 is a cross-sectional view taken along the line 3—3 of FIG. 2.

With reference to FIG. 1, a sheet 1 of a material such as metal or an electrical insulating material is placed on top of a die 2 which is supported on a platform 3. The die 2 is in the form of a tube of hardened steel having a sharp inner peripheral edge 4 (shown by the broken lines in FIG. 1) so as to constitute a cutting edge. An insert 5 of a material harder than the material of sheet 1 is placed in contact with the top face of this sheet. This insert has a generally cylindrical form and has a leading face 6 which is in contact with the top face of sheet 1, the periphery of this face 6 being sharp so as to constitute a cutting edge. A smooth walled section 7 separates face 6 from a knurled section 8 of the insert. This knurled section consists of a series of alternating vertical ridges 9 and grooves 10, both having a triangular cross-section as is best seen in FIG. 3.

Looking at FIGS. 2 and 3, the cross sectional diameter 11 of the smooth walled section 7 is equal to the smallest cross sectional diameter 12 of the knurled section 8. Also the length 13 of the knurled section 8, FIG. 1, is slightly greater than the width 14 of the sheet 1. The insert 5 also has a smooth walled head 15 which is separated from the knurled section 8 by a peripheral indentation such as a recess or groove 16. In practice, it is preferred that the leading face of the insert 5 extend very little beyond the sheet 1, to make the height of the smooth walled section 7, FIG. 1, as small as possible concomitant with providing a strong enough cutting edge to the leading face 6 of the insert and to withstand collapse of the insert under the combination of forces provided by the die and resistance to shearing by the sheet 1 on pressure being applied to the insert 5 by the ram 17. In practice it has been found that an insert capable of penetrating into a synthetic resin bonded laminate sheet of thickness approximately 0.0625 inch thick should have an overall vertical height from the underside of the head 15 to the leading face of the insert of about 0.09 inch and the height of the section 7 should be about 0.02 inch, or approximately one-fifth of the overall height from the underside of the head to the leading face.

A ram 17 is aligned in a vertical direction with the insert 5. It is preferred that the leading face of the ram be recessed to receive the head 15 so that the insert can be loaded into the ram instead of resting it on the sheet 1. When pressure is applied by the ram 17, the insert 5 is forced into the sheet 1 and co-operates with the die 2 to shear a disc 18 (FIG. 1) out of the sheet and into the die. At the same time, the insert 5 is forced into the aperture 19 (FIG. 3) as it is created. Once the knurled section 8 enters the partly formed aperture 19, its knurled walls form the walls of the aperture into a series of complementary grooves 20 and ridges 21. Once the insert is fully within the aperture 19, that is when the disc 18 has been completely sheared from the sheet 1 as shown in FIG. 2, the walls of the section 8 are keyed to the aperture walls due to the fact that a ridge 9 is in a groove 20 and a ridge 21 is in a groove 10. By making the length 13 of the section 8 slightly greater than length 14 of the sheet 1, once the lower face of the knurl contacts the edge 4 of die 2, it is peened over the bottom face 22 of the sheet 1 to form a flange 23 (FIG. 2) thereby riveting the insert 5 to the sheet 1. In addition, as the knurl on the section 8 passes through the aperture 19 it causes the sheet to stretch a certain amount. This stretched sheet relaxes back into the groove 16 once it has arrived at the top face 24 (FIG. 2) of the sheet 1 and forms a flange 25 that extends into the groove 16.

It will be seen that the insert 5 is secured in the sheet 1 without pre-drilling and is secured therein in three different fashions through the action of the knurled surfaces, the flange 23 and the flange 25. Tests have shown that to remove an insert of the approximate dimensions given above, when inserted into a typical synthetic resin bonded laminate sheet 0.625 inch thick, required a force of 50 to 70 lb. along the major axis of the insert before destruction of the joint occurs (sometimes by cracking of the sheet) and required a torque of 5 to 8 inch/lb. before the insert could be twisted from the sheet.

Figure 4:
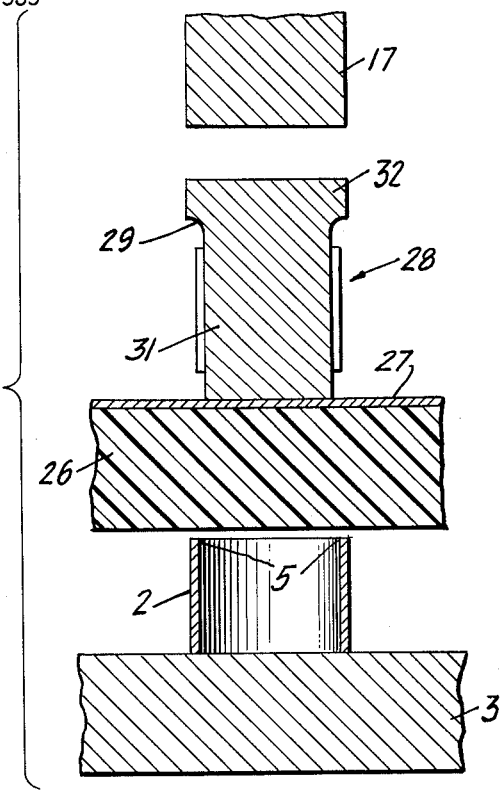
FIG. 4 is a view in sectional side elevation of an apparatus for inserting a rivet with a radiused surface constructed in accordance with another embodiment of the invention into a sheet of material having an electrical conducting surface.
Figure 5:
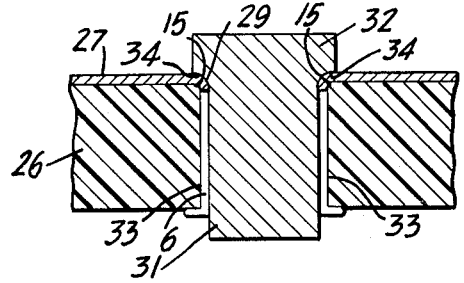
FIG. 5 is a view in sectional side elevation showing the rivet of FIG. 4 after insertion into the sheet of material.
Figure 6:
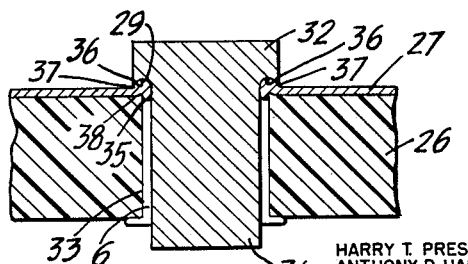
FIG. 6 is a view in sectional side elevation of an alternative form of a rivet after insertion into a sheet of material.

In FIGS. 4 to 6, a sheet 26 of synthetic resin bonded laminate, such as that known under the registered trademark "Bakelite," has a cladding 27 of a conducting material such as copper on its face. The material is placed on top of a die 2 supported on a platform 3 as in the case of FIG. 1. An insert 28 of a material such as brass, which is harder than the material of the sheet 26, is brought into contact with the cladding 27. The insert 28 is similar to the insert 5, FIG. 1, with the difference that instead of a peripheral recess or groove 16 separating the knurled section 8 from the head 15 of the insert 5, another form of peripheral indentation, namely a radiused surface 29, separates a knurled section 31 from a head 32.

When pressure is applied by a ram 17, the insert 28 is forced through the cladding 27 into the sheet 26. In passing through the sheet and cladding, the insert creates an aperture 33 which grips the knurled section 31 in the manner previously described. Once the knurled section has passed into the sheet, the application of pressure is continued until the underside of the head 32 comes into contact with the top surface of the cladding. This continued application of pressure coupled with the radiused surface 29 has the effect of turning down the cladding so that it forms a narrow curved wall skirt 34, FIG. 5. The curvature of the walls of this skirt conforms with the radiused surface 29 thereby ensuring good electrical contact between the cladding 27 and the insert 28.

The bottom of the head 32 of the insert shown in FIGS. 4 and 5 is flat. In this case there is a danger that swarf riding up the grooves in the knurled section 31 of the insert may accumulate between the bottom of the insert and the cladding 27 and prevent the insert from making good contact with the top face of cladding 27. While even though this effect would not prevent a good electrical contact between skirt 34 and radiused surface 29 due to the fact the skirt 34 is formed by radiused surface 29, it is sometimes desirable that extra precautions be taken to insure good electrical contact. Therefore, peripheral indentation in the underside of the head 32 may be dished as at 36, FIG. 6 to receive the skirt 35. In this case any swarf formed during the passage of the knurled section 31 of the insert 28 through the sheet 26 is forced up under the cladding into the dished part 36 so that the cladding is deformed as shown at 38 and makes contact with substantially the whole of the underside of the flange. In order to prevent the underside of the head 32 from cutting right through the cladding and severing a part of it off from the remainder, it is preferred that the periphery 37 have a flat face and not have a cutting edge. This presupposes, of course, that the head 32 has an adequate cross-section so that its underside can be dished and yet leave a flat surface surrounding the dish part. If the head 32 is not too large, it may have a polygonal cross-section, for example hexagonal, instead of circular as this form is better suited to being constructed with a dish part and with at least a partial flat surface surrounding the dish part.

The embodiment of the invention illustrated in FIGS. 4 to 6 finds many applications where good electrical contact between an electrical conducting material and an attachment thereto is required, as, for example, between a printed circuit and a printed circuit component. A large number of components can be visualized by replacing the heads of the inserts 28 of FIGS. 4, 5 and 6 by various heads which constitute electrical and electronic components. It is also within the scope of the invention to provide a bore in the bottom or top part of an article or an insert or extending right through it. The insert parts of all such components may be slotted in accordance with the technique described hereunder so that these components may be utilized to secure elongated members, such as electrical leads, to sheet material such as printed circuits.

Figure 7:
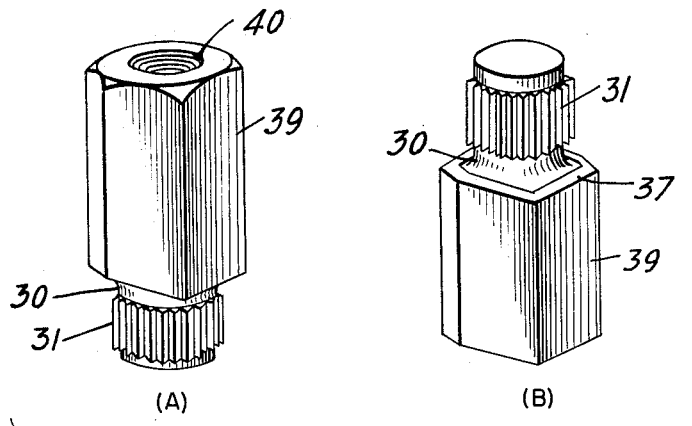
FIGS. 7 and 8 are perspective views of terminals constructed in accordance with the present invention.
Figure 8:
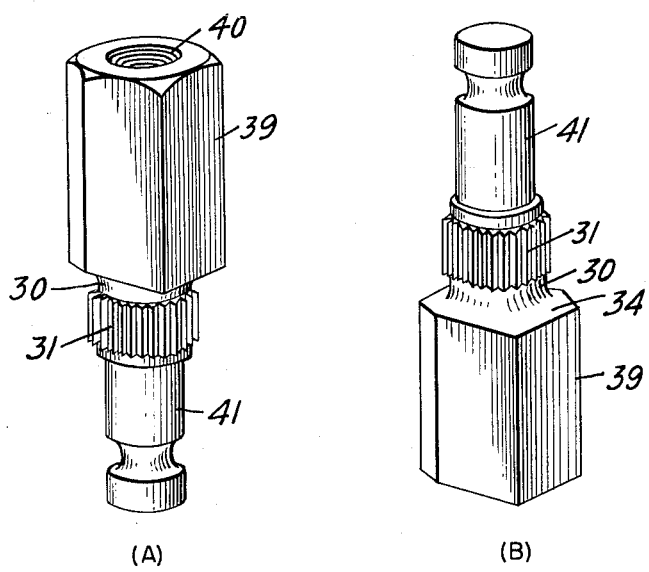

In FIGS. 7 and 8, two forms of terminal bodies are shown to illustrate the invention as applied to electrical components. The head 32 shown in FIGS. 4 to 6 is replaced by a terminal body 39, FIG. 7 consisting of a shank of hexagonal cross-section having a threaded internal bore 40 to take a fixing screw. As seen from the inverted view in FIG. 7(b), the underside face of the body 39 is dished as at 30, the dish 30 being surrounded by a flat surface 37. Other parts of the terminal body are similar to the insert shown in FIGS. 4 to 6 and are numbered to correspond thereto.

FIG. 8 illustrates a terminal body similar to that of FIG. 7 but with a solder spill 41 at the insert end thereof. This terminal body may be secured to a sheet material by the techniques of the present invention as previously explained. In FIG. 8, the construction is very similar to that of the terminal body of FIG. 7 and like parts have been numbered to correspond. However, in FIG. 8, as seen from the inverted view of FIG. 8(b), the underside face 34 of the body 39 is not dished but is flat.

It will be appreciated that the terminal body may be constructed with a shank of circular cross-section. Also the invention is in no way limited by its application to terminal bodies. Any suitable form of electrical or electronic component can replace the terminal bodies specifically described therein. Where the insert is of an electrical conducting metal, the method of securing it to the sheet according to this invention gives an extremely good dry electrical contact. The embodiments shown in FIGS. 4 and 5, therefore, enable various electronic and electrical components to be connected to printed circuits without the need for pre-drilling holes. Also, these contacts between the inserts and the sheet can do away with the need for soldering the inserts to printed circuits. The connection of the electrical and electronic components to printed circuits by the technique illustrated in FIGS. 1-3 can be achieved by replacing the head 15 with the appropriate components, either by replacing the head 15 by the component formed integrally with the insert or by securing the appropriate component to the head 15 in any suitable manner or by using an appropriately formed insert as a rivet to secure a component to the sheet. It will be seen from FIGS. 5 and 6 that very little of the insert extends beyond the lower face of the sheet 26. This means that it is possible to arrange two printed circuit plates in face-to-face parallel relationship with adjacent faces closely juxtaposed, thereby resulting in a saving of space. Again the fact that a secure joint is obtained directly after the insert has been secured to the sheet material of a printed circuit means that the operation of bending over tags passed through holes in a printed circuit plate for the object of temporarily securing a component to such a circuit pending a soldering operation can be dispensed with.

It is also possible to reverse the sheet 26 in the arrangement of FIGS. 4, 5 and 6 so that the copper cladding 27 is in contact with a flange formed like the flange 23 in FIG. 2. In this way a cold welded joint may be obtained which is advantageous from an electrical contact aspect.

While the arrangement of FIGS. 4 to 6 described above in connection with printed circuitry is suitable where good electrical contact is necessary, the method and articles of the invention are by no means limited to this application since, as in the case of the arrangement of FIGS. 1 to 3, improved mechanical fixing is the primary aim.

Figure 9:
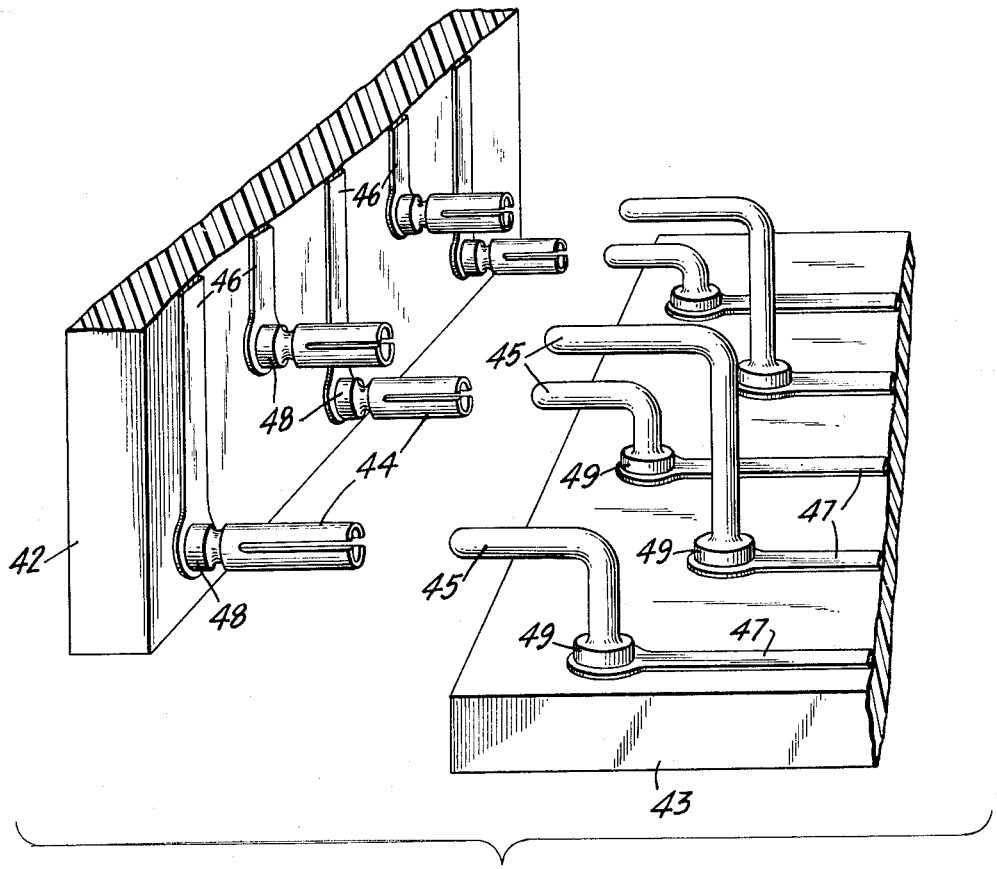
FIG. 9 is an arrangement showing two printed circuits and means constructed in accordance with the invention for electrically connecting the circuits together.

In FIG. 9 there is illustrated one way of connecting two printed circuit boards 42, 43 at right-angles to each other using straight sockets 44 and right-angled plug pins 45, although an analogous arrangement may be achieved using right-angled sockets and straight plugs. In this arrangement it is assumed that the printed leads 46 on boards 42 and 47 on board 43 are a distance of 0.1 inch apart. To enable the flanges 48 on the sockets and the flanges 49 on the plugs to be accommodated without having to make such flanges too small, the adjacent plugs and sockets are staggered in their respective boards in two rows as shown. It is considered that the right-angular construction of the plug pin will impart sufficient floating movement to these to enable them to align up and enter into the complementary sockets when the plugs are presented to the sockets. The lower ends of the sockets and plugs may be formed similar to the lower end of the terminal shown in FIG. 7(a) so that they can be fixed to the printed leads 46, 47 by the method of the invention.

All the plugs 45 may be inserted into the board 43 in a single operation by loading them into a suitable jig. Likewise the sockets 44 may be inserted into the board 42 in a single operation also by loading them into a complementary jig. It is possible to make such jigs very accurately so that when the plugs and sockets are in the board, they deviate very little from their positions of alignment, so that the problem of providing floating movement to the plug and/or socket usually encountered when a plurality of plugs have to enter a plurality of sockets would not tend to arise. It is possible, however, to either provide the plug and/or sockets in FIG. 9 with individual insulating supports or to provide a common support for an entire set. Such a support could be secured to the boards 42 or 43 by rivets made in accordance with the invention. If the support is of a resilient material, it could be utilized to provide close fitting sleeves which act as circlips about the respective sockets, to impart springiness thereto. This is advantageous in that the sockets could be made of a material such as leaded brass which is cheap and easy to work instead of a more expensive and springier material such as hardened Phosphor bronze or beryllium copper which are not so easily worked.

Figure 10:
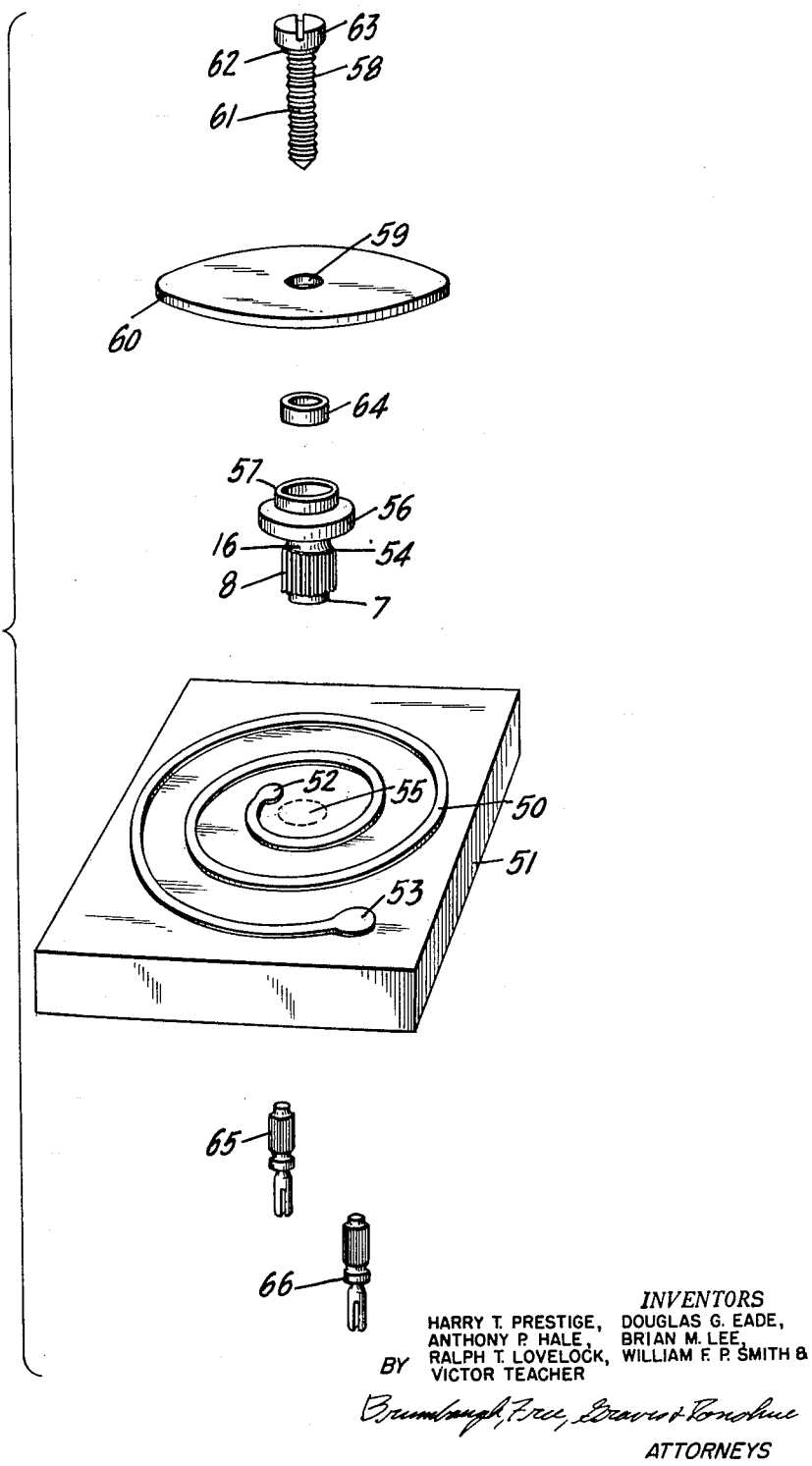
FIG. 10 is an exploded perspective view of a variable inductor constructed in accordance with the present invention.
Figure 11:
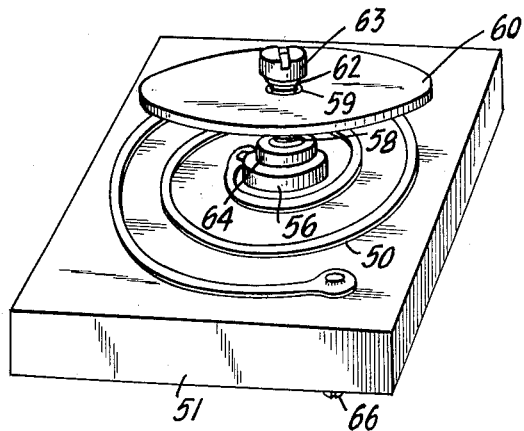
FIG. 11 is a perspective view of the variable inductor of FIG. 10 after assembly.

FIGS. 10 and 11 show a variable reactance device constructed in printed circuit form which is made readily practicable through the technique of the present invention. The device includes a variable inductor consisting of a spiral coil 50 printed on a sheet of electrical insulating material 51 such as "Bakelite." The coil terminates in two circles 52, 53. The inductance of such a coil is varied by moving a metal disc 60, arranged face-to-face with the top of the sheet 51, towards and away from the coil. To this end, a bush 54 is inserted into the sheet 51 at the center of the coil 50 as shown by the broken line circle 55 in FIG. 10. The bush consists of insert 8, formed in accordance with the present invention, that is integral with a flange 56 having an annulus 57 on its top face. The bush has a concentrically arranged bore extending from the top to the bottom face. This bore is internally threaded to accommodate a screw 58 having a threaded shank 61 of maximum diameter such that it can be forced through an aperture 59 at the center of the disc 60 which may be made of brass or other suitable metal. The shank 61 of the screw 58 has an undercut groove 62 just beneath the head 63 of the screw. The shank 58 may be forced through aperture 59 until the peripheral walls of the aperture are accommodated in the groove 62 to secure the disc 60 to the screw with its face normal to the major axis of the screw. The screw shank 61 is restrained from moving in and out of the bore in the bush 54 with too coarse a movement by a ring 64 of nylon or other suitable insulating material which can rest concentrically within the annulus 57 on the flange 56 of the bush, this annulus being lipped over the ring to retain it in position. The internal diameter of the ring 64 is such that the shank 61 of the screw 58 is a force fit therethrough. Other conventional means of ensuring that the movement of the screw shank in and out of the bush is not too coarse may be adopted, the ring 64 being described by way of example. To assemble the variable inductance, all it is necessary to do is to fix the disc 60 into the undercut 62 of the screw shank 61 by forcing the latter through the aperture 59 until the plate is immediately underneath the screw head 63. The ring 64 is inserted into the annulus 57 which is then turned over to form a lip which is the ring within the annulus. The assembly of bush 54 and ring 64 is then pressed into the sheet 51 at the circle 55 in accordance with the technique of the invention. Two turret lugs 65 and 66 are then pressed, also by the methods of the invention, into the underside of the sheet 51 to penetrate into the circles 52 and 53, respectively, and form means for connecting the coil 51 to a piece of equipment and/or to another component and/or circuit.

The assembled variable inductance is shown in FIG. 11. To vary the inductance of such a device all that is necessary is to alter the vertical distance between the printed coil 50 and the disc 60 by turning the screw 58 into or out of the bush 54. While the screw head 63 is adapted to receive a screwdriver it will be recognized that it can be provided with any other turning means, for example a knob for operating the device directly with the fingers. It will also be realized that the coil 50, while shown as a separate and distinct entity, may itself form part of a printed circuit having other components and be connected to such other components by printed leads. Some of such other components may themselves be printed, and the invention visualizes a printed circuit containing a plurality of devices such as those described with reference to FIGS. 10 and 11 wherein the coils 50 are either directly or indirectly inter-connected by printed leads. In this last mentioned arrangement it may be desirable to dispense partly or completely with the turret lugs 65 and 66.

It will be appreciated that although a device of the type illustrated in FIGS. 10 and 11 can be constructed by methods which do not utilize a bush having an insert in accordance with the present invention secured at the center of a printed coil by the method of the invention, the present invention is advantageous since, when applied to such a variable reactance device of the type described, it enables such a device to be constructed rapidly and relatively cheaply.

Figure 12:
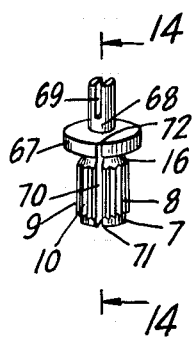
FIGS. 12 and 13 are perspective views of a rivet constructed in accordance with an embodiment of the invention.
Figure 13:
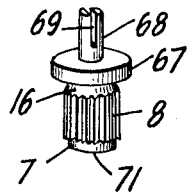
Figure 14:
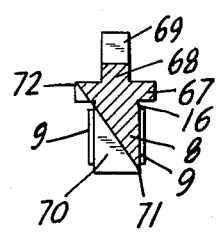
FIG. 14 is a cross sectional view taken along the line 14—14 of FIG. 12.

FIGS. 12 to 18 illustrate a method of fixing components having wired leads to a printed circuit board or other sheet of material. To carry out this technique special rivets or lugs shown in FIGS. 12 to 14 are needed. These rivets consist of an insert 8 having a knurling consisting of a plurality of ridges 9 and grooves 10, a smooth wall section 7 and an undercut portion 16 (or a radius 30 as before). The head of the rivet consists of a flange 67 with a spigot 68 projecting from its top face. The spigot has a vertical slot 69 extending from its top face, this slot being dimensioned to receive an electrical lead such as is commonly used to secure components which may be dimensionally small capacitors and resistors, to printed circuit boards, by passing such leads through suitable holes in the boards. Additionally, the rivet has a diagonal slot 70 extending from a point 71 on or near one peripheral edge of the cutting face (that is the bottom face in FIGS. 12 to 14) of the rivet to a diametrically opposed point 72 on the periphery of the flange 67. The width of this slot is such that it can also accommodate an electrical lead.

Figure 16:
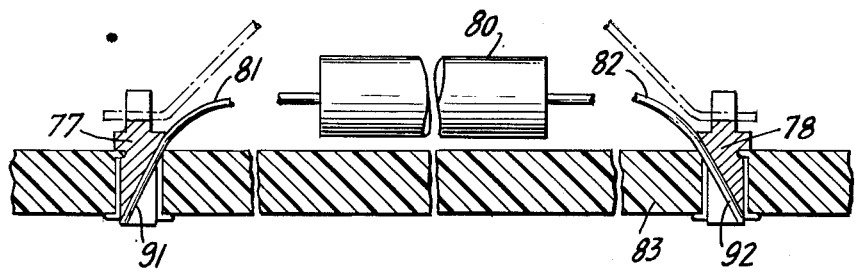
FIGS. 15 to 18 are views of an apparatus for utilizing rivets of the type illustrated in FIGS. 12 to 14 to secure two electrical leads attached to an electrical component.
Figure 17:
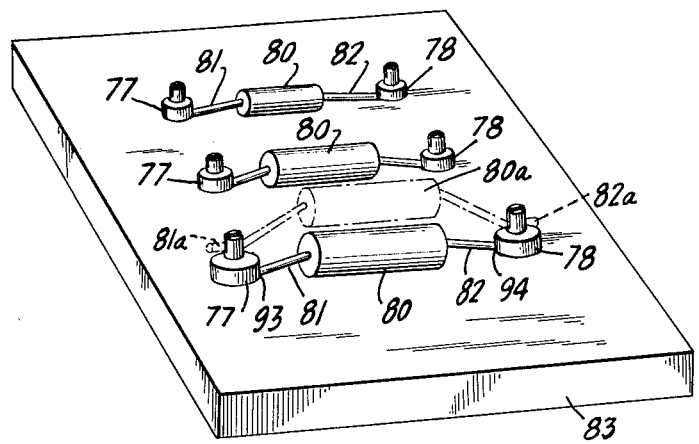
Figure 15:
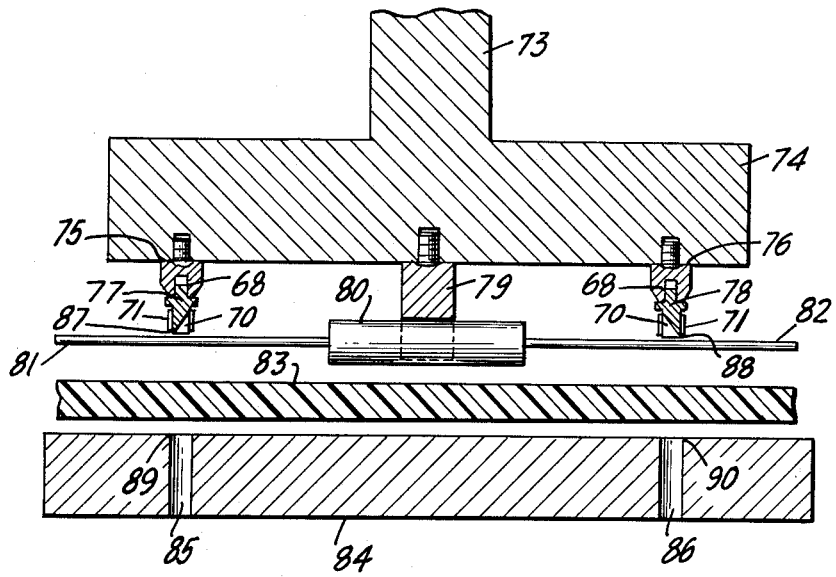
Figure 18:
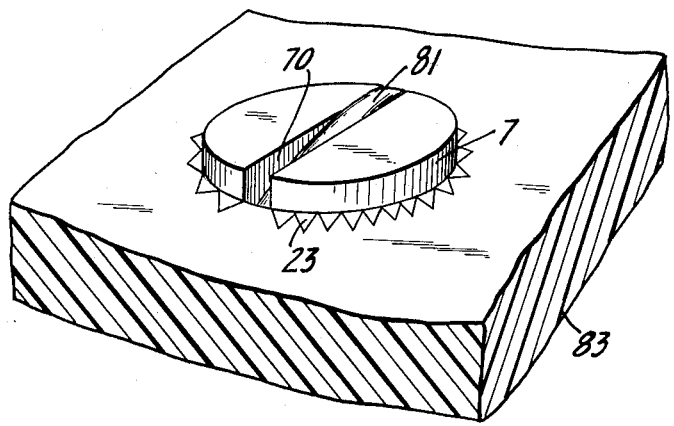

The manner in which such a rivet or lug is utilized to secure an elongated member, such as an electric lead attached to a dimensionally small resistor or capacitor, to a sheet material is illustrated in FIG. 15. A ram or a punch of a pressure applying device includes a shank 73 connected to a cross member 74. The cross member carries on its underside two identical spaced apart chucks 75 and 76 each capable of accommodating the spigots 68 of a pair of rivets 77 and 78. The underside of the cross member 74 also carries a sheet metal clip 79 which is capable of embracing a component 80 such as a dimensionally small capacitor or resistor of roughly cylindrical shape. Such a component 80 is shown retained by the clip 79 with its leads 81 and 82 extending outwardly on either side. Lead 81 is disposed below rivet 77 so as to be in alignment with the slot 70 in this rivet while lead 82 is similarly located below rivet 78. The sheet material 83 to which it is desired to secure the component, rests directly beneath the component on a die plate 84. This die plate has two bores 85 and 86 passing therethrough, these bores being so formed as to co-operate with the chucks 75 and 76, respectively and the rivets 77 and 78, respectively, to enable the latter to be secured to the board in accordance with the methods of the present invention. On pressure being applied by the ram, the rivets are brought to bear on the sheet and at the same time the leads 81 and 82 are caused to enter the slots 70 in the rivets. As pressure continues to be applied, the bores 85 and 86 co-operate with the chucks 75 and 76, respectively, and the rivets 77 and 78, respectively, and cause the insert parts of the latter to enter the sheet 83 and be secured thereto in accordance with the methods of the present invention. At the same time the edges of the slots 70 at the points 71 bear on the leads 81 and 82 at the points 87 and 88. These edges of the slots act as cutting edges and co-operate with points 89 and 90 on the peripheral wall of the top face of the bores 85 and 86 to nip the parts of leads extending beyond points 71. The parts of the leads which are within the slots 70 are forced through the sheet 83 along with the insert parts of the rivets and assume the sloping positions represented by the portions 91 and 92 in FIG. 16. Furthermore, as the insert parts of the rivets pass through the sheet 83, the resistance of the sheet to shear causes the walls of the slots 70 to be squeezed on to the parts 91 and 92 of the leads, thereby tending to ensure extremely good, dry electrical contacts between the leads and the rivets as can be seen from FIGS. 16 and 18. Not only are the leads tightly held by the walls of slots 70 but, as has been previously described, the rivet itself is securely held to the sheet 83 and is in good dry electrical contact with any metal cladding on such a sheet when it is a printed circuit board. Once the component 80 has been secured to the sheet 83 as shown in FIGS. 16 to 18, the ram can be withdrawn. The clip 79 and the chucks 75 and 76 are constructed so that on withdrawal of the ram, the component 80 is freed from its embrace and the rivets 77 and 78 are removed from the retracting chucks 75 and 76. The sheet 83 may be held against vertical movement by any conventional means (not shown).

FIG. 17 is a diagrammatic perspective arrangement showing a number of resistors and/or capacitors 80 secured to a sheet 83 by the methods of the invention described with regard to FIGS. 15 and 16. It can be seen that any one component 80, supposedly defective, can be easily removed from the arrangement by severing its leads 81 and 82 at points 93 and 94, respectively. A new component 80a shown in broken lines, can replace this component simply by soldering its leads 81a and 82a to the slots in the spigots of the rivets. This feature may be advantageous in the servicing of electronic equipment containing printed circuitry. Also the rivets themselves as shown or suitably formed may be used as test points for detecting faulty components. If desired the spigots of the rivets may be so designed as to permit replacement components to be wire wrapped to them instead of being soldered thereto. It will be realized that components such as 80a need not replace components 80, but may be additional thereto. Also a component such as 80a need not necessarily be connected across the rivets of any one component but may interconnect rivets attached to different components. This enables components to be formed on a printed circuit in a two-or-more tiered arrangement thereby tending to reduce the size of printed circuit boards for any given number of components. The rivets may also be interconnected by conventional leads instead of leads attached to a component thereby increasing the versatility of connections which can be made in any printed circuit board of a given size.

Although the embodiment illustrated in FIGS. 15 to 18 has been described as employing leads conventionally connected to electronic components such as resistors and capacitors of small physical dimensions, the same technique can be used for quite thick leads, for example, about 1/8 to 1/4 inch on stepping up the dimension of the rivets. This aspect has considerable importance in high current and voltage circuitry.

It will be appreciated that it is within the scope of the present invention to insert the inserts in sheet material by forms of pressure applying devices other than rams of presses. For example, they may be fired into a sheet material by a suitably modified rivet gun. The inserts can also be used to secure two or more sheets of material to form laminates or riveted joints as appropriate. As such, the invention can be applied to many other industries other than electronics industries where mechanical fixing is required; for example, the aircraft accessory industry or motor accessory industry or instrument and clock making industry or the building industry to mention but a few. Many other applications replacing conventional fixing come readily to mind and would be considered within the scope of the present applications as would many new mechanical fixing applications which might now arise out of the realization of the new method and article of the present invention.

It will be further appreciated that although the invention has been described in connection with the securing of a single insert to a sheet material, it is possible to design suitable forms of jigs and pressure applying device punches or rams to insert a number of inserts simultaneously in predetermined positions in sheet material by a single application of pressure. It is also within the scope of the invention to feed a succession of inserts to a predetermined position or positions on a piece of sheet material by any suitable form of feeding device and to synchronize the operation of the pressure applying device with that of the feeding device to secure inserts in the sheet material in succession as they are presented thereto.

While particular embodiments of the present invention have been shown and described for purpose of illustration, it is apparent that changes and modifications may be made thereto without departing from this invention in its broader aspects. Therefore, the invention described herein is not to be construed as limited to the specific embodiment described but is intended to encompass all modifications thereof coming within the scope of the following claims.

We claim:
1. A method of securing a substantially rigid insert in a substantially rigid sheet of material comprising the steps of
positioning on one side of the sheet an insert having a shank formed with (a) a leading face, (b) a cutting edge along the periphery of the leading face, (c) a connecting part behind the leading face and (d) a knurled keying section behind the connecting part having cross-sectional dimensions sufficiently greater than those of the leading face and the connecting part to enlarge an aperture cut in the sheet of material by the cutting edge and shape the aperture walls so that the aperture walls are keyed to the keying section, and having a length at least substantially as great as the thickness of the sheet,
positioning on the opposite side of the sheet a die having a cutting edge of substantially the same contour as the contour of the cutting edge of the insert, the cutting edge of the die being coaxial with and facing the cutting edge of the insert,
forcing the die and insert against the sheet to shear a slug from the sheet and form an aperture in the sheet,
passing the connecting part through the aperture, and
forcing the keying section into the aperture to enlarge the aperture and shape the walls thereof so that they are keyed to the insert.

2. A method of securing a substantially rigid insert in a substantially rigid sheet of material comprising the steps of
positioning on one side of the sheet an insert having a shank formed with (a) a head at one end, (b) a leading face at the opposite end, (c) a cutting edge along the periphery of the leading face, (d) a connecting part behind the leading face, and (e) a knurled keying section behind the connecting part having (i) cross-sectional dimensions sufficiently greater than those of the leading face and the connecting part to enlarge an aperture cut in a sheet of material by the cutting edge and shape the aperture walls so that the aperture walls are keyed to the keying section and (ii) a length substantially as great as the thickness of the sheet,
positioning on the opposite side of the sheet a die having a cutting edge of substantially the same contour as the contour of the cutting edge of the insert, the cutting edge of the die being coaxial with and facing the cutting edge of the insert,
forcing the die and insert against the sheet to shear a slug from the sheet and form an aperture in the sheet,
passing the connecting part through the aperture,
forcing the keying section into the aperture to enlarge the aperture and shape the walls thereof so that they are keyed to the insert, and
forcing the keying section beyond the sheet and against the die to peen the leading part of the keying section over the sheet.

3. A method of securing a substantially rigid insert in a substantially rigid sheet of material and to an elongated member comprising the steps of
positioning on one side of the sheet an insert having a shank formed with (a) a head at one end, (b) a leading face at the opposite end, (c) a cutting edge along the periphery of the leading face, (d) a connecting part behind the leading face, and (e) a knurled keying section behind the connecting part having cross-sectional dimensions sufficiently greater than those of the leading face and connecting part to enlarge an aperture cut in a sheet of material by the cutting edge and shape the aperture walls so that the aperture walls are keyed to the keying section, and (f) a slot extending across the shank from a point near the periphery of the leading face to a diametrically-opposed point on the peripheral wall of the head,
positioning on the opposite side of the sheet a die having a cutting edge of substantially the same contour as the contour of the cutting edge of the insert, the cutting edge of the die being coaxial with and facing the cutting edge of the insert,
inserting the elongated member between the insert and the sheet,
aligning a first portion of the elongated member with the slot, trailing a second portion of the elongated member away from the insert on the side thereof on which said diametrically-opposed point is located, forcing the insert and the die inwardly against the elongated member and into the sheet to force the elongated member into the slot, applying further force to the insert and die to shear a slug from the sheet and form an aperture in the sheet, passing the connecting part through the aperture, and forcing the keying section into the aperture to enlarge the aperture and shape the walls thereof so that they are keyed to the insert.

4. An insert adapted to be secured in a sheet of material comprising a shank formed with (*a*) a head at one end, (*b*) a peripheral indentation adjacent to the head, (*c*) a leading face at the opposite end, (*d*) a cutting edge along the periphery of the leading face, (*e*) a connecting part behind the leading face, (*f*) a knurled keying section behind the connecting part having cross-sectional dimensions sufficiently greater than those of the leading face and the connecting part to enlarge an aperture cut in a sheet of material by the cutting edge and shape the aperture walls so that the aperture walls are keyed to the keying section, and (*g*) a slot extending across the shank from a point near the periphery of the leading face to a diametrically-opposed point on the peripheral wall of the head.

References Cited in the file of this patent
UNITED STATES PATENTS

| | | |
|---|---|---|
| 1,001,054 | Lawrence | Aug. 22, 1911 |
| 1,128,532 | Schmidt | Feb. 16, 1915 |
| 1,359,324 | Bullock | Nov. 16, 1920 |
| 1,762,163 | Eckstein et al. | June 10, 1930 |
| 2,098,892 | Sintz | Nov. 9, 1937 |
| 2,120,711 | Phillips | June 14, 1938 |
| 2,255,184 | Osenberg | Sept. 9, 1941 |
| 2,309,146 | Whistler | Jan. 26, 1943 |
| 2,782,491 | Cole | Feb. 26, 1957 |
| 2,799,188 | Newcomb | July 16, 1957 |
| 2,854,074 | Frank et al. | Sept. 30, 1958 |
| 2,859,511 | Gallagher et al. | Nov. 11, 1958 |
| 2,918,521 | Abrams | Dec. 22, 1959 |
| 2,931,008 | Abrams | Mar. 29, 1960 |
| 2,942,332 | Wright et al. | June 28, 1960 |
| 2,955,351 | McCreadie | Oct. 11, 1960 |
| 2,978,800 | Blain | Apr. 11, 1961 |
| 2,997,530 | Rosan | Aug. 22, 1961 |

FOREIGN PATENTS

| | | |
|---|---|---|
| 539,221 | Canada | Apr. 9, 1957 |